(12) United States Patent
Hata et al.

(10) Patent No.: US 10,202,113 B2
(45) Date of Patent: Feb. 12, 2019

(54) ENGINE STARTING CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Kensei Hata, Shizuoka-ken (JP); Akira Murakami, Gotemba (JP); Hidekazu Nagai, Susono (JP); Takahito Endo, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/479,513

(22) Filed: Apr. 5, 2017

(65) Prior Publication Data

US 2017/0291597 A1 Oct. 12, 2017

(30) Foreign Application Priority Data

Apr. 7, 2016 (JP) .................. 2016-077279

(51) Int. Cl.
*B60W 20/40* (2016.01)
*B60K 6/26* (2007.10)
(Continued)

(52) U.S. Cl.
CPC .............. *B60W 20/40* (2013.01); *B60K 6/26* (2013.01); *B60K 6/365* (2013.01); *B60K 6/387* (2013.01); *B60K 6/445* (2013.01); *B60W 10/06* (2013.01); *B60W 10/08* (2013.01); *B60W 30/18036* (2013.01); *B60K 2006/268* (2013.01); *B60W 2520/10* (2013.01); *B60W 2710/06* (2013.01); *B60W 2710/08* (2013.01); *B60Y 2200/92* (2013.01); *B60Y 2300/182* (2013.01); *B60Y 2300/18033* (2013.01); *B60Y 2300/192* (2013.01); *B60Y 2300/43* (2013.01); *B60Y 2300/60* (2013.01); *B60Y 2400/42* (2013.01); *B60Y 2400/60* (2013.01); *B60Y 2400/73* (2013.01); *Y10S 903/906* (2013.01); *Y10S 903/91* (2013.01); *Y10S 903/914* (2013.01); *Y10S 903/93* (2013.01)

(58) Field of Classification Search
CPC .................................... B60W 20/40
See application file for complete search history.

(56) References Cited

U.S. PATENT DOCUMENTS

| 5,788,006 | A | * | 8/1998 | Yamaguchi | ............ | B60K 6/365 |
| | | | | | | 180/65.235 |
| 2006/0027413 | A1 | * | 2/2006 | Tabata | ................... | B60K 6/365 |
| | | | | | | 180/305 |

FOREIGN PATENT DOCUMENTS

JP H08-295140 A 11/1996

* cited by examiner

*Primary Examiner* — Imran K Mustafa
(74) *Attorney, Agent, or Firm* — Hunton Andrews Kurth LLP

(57) ABSTRACT

An engine starting control system for hybrid vehicles is provided to prevent a temporal drop in drive force when starting an engine. The control system maintains an operating mode of a switching mechanism when starting the engine by the first motor, in a case that the vehicle is propelled in the forward direction by the first motor and that the switching mechanism is in a second mode, or in a case that the vehicle is propelled in the reverse direction by the first motor and that the switching mechanism is in the first mode. Thereafter, the control system increases a rotational speed of the engine to a self-sustaining speed, switches the operating mode of the switching mechanism, and increases torque of the engine.

12 Claims, 9 Drawing Sheets

(51) Int. Cl.
  *B60K 6/365*  (2007.10)
  *B60K 6/387*  (2007.10)
  *B60W 10/06*  (2006.01)
  *B60W 10/08*  (2006.01)
  *B60W 30/18*  (2012.01)
  *B60K 6/445*  (2007.10)

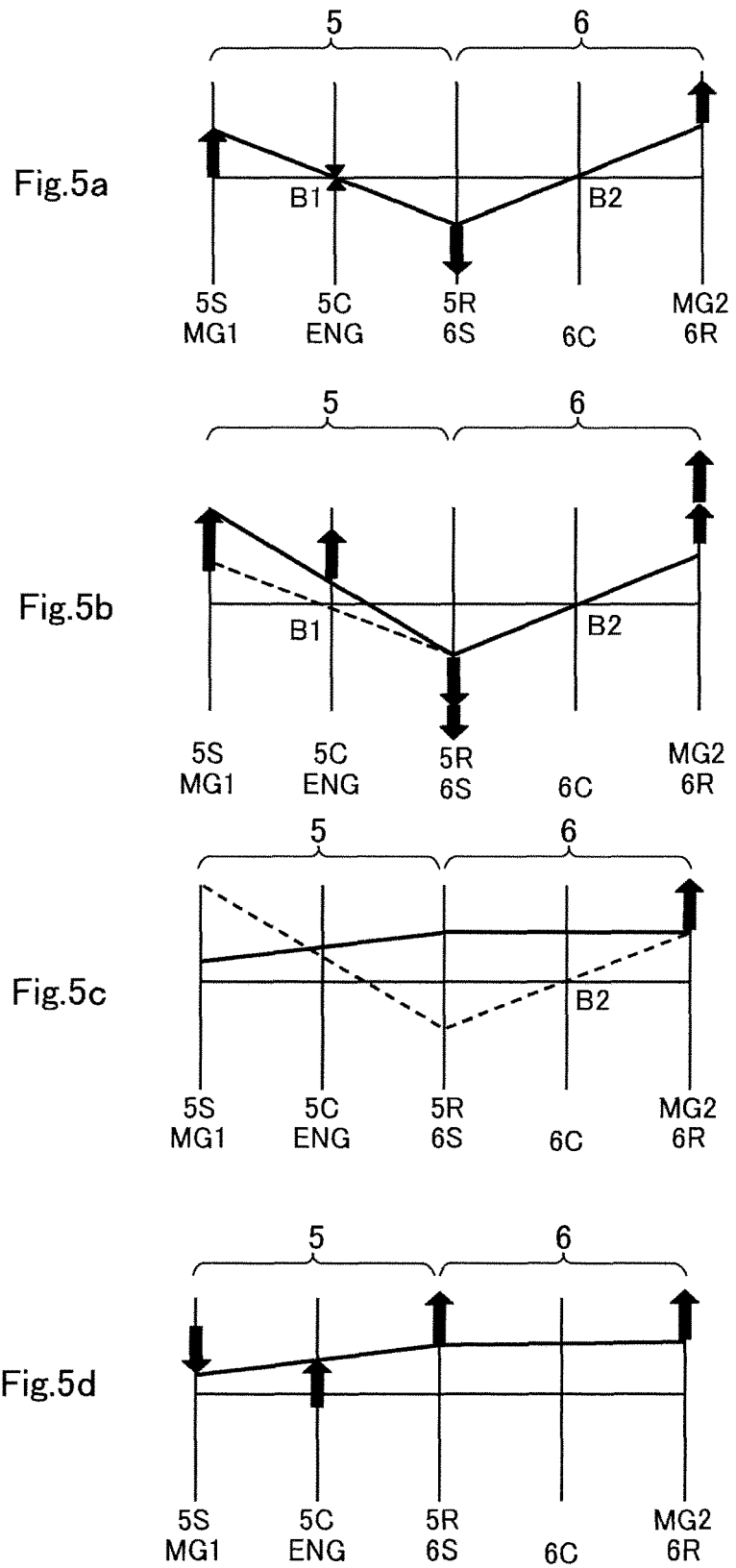

ENGINE STARTING CONTROL SYSTEM FOR HYBRID VEHICLE

The present invention claims the benefit of Japanese Patent Application No. 2016-077279 filed on Apr. 7, 2016 with the Japanese Patent Office, the disclosure of which is incorporated herein by reference in its entirety.

BACKGROUND

Field of the Invention

Preferred embodiments relate to the art of a control system for hybrid in which a prime mover includes an engine and a motor having a generating function, and especially to an engine starting control system for hybrid vehicles configured to control the motor to start the engine.

Discussion of the Related Art

JP-A-08-295140 describes one example of a hybrid vehicle having an engine, a motor, and a generator allowed to serve as a motor by supplying electric power thereto. In the hybrid vehicle taught by JP-A-08-295140, the engine and the generator are connected to a planetary gear unit, and the motor is connected to an output element of the planetary gear unit. In order to power the vehicle by the motor and the generator instead of the engine, an input element of the planetary gear unit is restricted to be rotated in an opposite direction to a rotational direction of the engine by a one-way clutch.

In the planetary gear unit taught by JP-A-08-295140, a torque applied to an input element is outputted from the output element while being changed in accordance with a gear ratio of the planetary gear unit by establishing a reaction against the torque applied to the input element by a reaction element. For example, when operating the generator as a motor, the rotary element connected to the engine establishes a reaction. To this end, a rotation of the input torque is stopped by the one-way clutch. By contrast, when starting the engine during forward propulsion of the vehicle while operating the generator as a motor, the rotary element connected to the generator serves as an input element, the rotary element connected to the engine serves as an output element, and the rotary element delivering driving force to drive wheels serves as a reaction element. In this case, when cranking the engine by an output torque of the generator, the torque of the rotary element delivering the driving force to the drive wheels may be dropped. Consequently, in the hybrid vehicle taught by JP-A-08-295140, a vehicle speed or acceleration may be dropped temporarily.

SUMMARY OF THE INVENTION

Aspects of embodiments have been conceived noting the foregoing technical problems, and it is therefore an object of embodiments is to provide an engine starting control system for hybrid vehicles that can start an engine by a motor without causing a temporal drop in drive force.

The engine starting control system according to the preferred embodiment is applied to a hybrid vehicle, comprising: a differential mechanism including a first rotary element connected to an engine, a second rotary element connected to a first motor, and a third rotary element delivering torque to drive wheels; and a stopping member that selectively stops a rotation of the first rotary member. In the hybrid vehicle, an output torque of the first motor is applied to the third rotary element while stopping the rotation of the first rotary element by the stopping member. The engine starting control system comprises: a switching mechanism including an input member rotated integrally with the third rotary element and an output member connected to the drive wheels, in which an operating mode is switched between a first mode in which the input member and the output member are rotated in the same direction, and a second mode in which the input member and the output member are rotated in opposite directions; and a controller that controls the engine, the first motor, and the switching mechanism. In order to achieve the above-explained objective, according to the embodiment of the present application, the controller is configured: to maintain the operating mode of the switching mechanism when starting the engine by the first motor, in a case that the hybrid vehicle is propelled in the forward direction by a torque of the first motor and that the switching mechanism is in the second mode, or in a case that the hybrid vehicle is propelled in the reverse direction by the torque of the first motor and that the switching mechanism is in the first mode; to increase a rotational speed of the engine to a level at which combustion of the engine can be maintained; and to switch the operating mode of the switching mechanism by reversing a rotation of the input member when the rotational speed of the engine is increased to the level at which combustion of the engine can be maintained.

In a non-limiting embodiment, the controller may be further configured: to determine whether or not a speed of the hybrid vehicle is lower than a reference speed; and to execute the control to maintain the operating mode of the switching mechanism when starting the engine by the first motor, and the control to increase the rotational speed of the engine to the level at which combustion of the engine can be maintained, in a case that the speed of the hybrid vehicle is lower than the reference speed.

In a non-limiting embodiment, the switching mechanism may comprise: a planetary gear unit adapted to perform a differential action among rotary elements including a sun gear, a ring gear and a carrier supporting pinion gears interposed between the sun gear and the ring gear; a clutch that establishes the first mode in the switching mechanism by connecting any two of rotary elements of the planetary gear unit to rotate the planetary gear unit integrally; and a brake that establishes the second mode in the switching mechanism by restricting a rotation of any one of the rotary elements of the planetary gear unit.

In a non-limiting embodiment, the sun gear may be connected to the input member, the ring gear may be connected to the output member, and the carrier may be connected to the brake. In addition, the second mode may be established in the switching mechanism by halting the carrier by the brake.

In a non-limiting embodiment, the first motor may include a motor-generator having a generating function, and the hybrid vehicle may further comprises at least one second motor that is operated by an electric power generated by the motor-generator to generate a drive force for propelling the hybrid vehicle. That is, the hybrid vehicle may be powered by the first motor and the second motor.

According to the embodiment of the present application, when starting the engine by the first motor during propulsion, an output torque of the first motor is applied to drive wheels in a current travelling direction of the hybrid vehicle. According to the embodiment, therefore, a temporal drop in the drive force can be prevented when starting the engine. As described, output torque of the engine is increased after switching the operating mode of the switching mechanism.

According to the embodiment, therefore, the output torque of the engine can be transmitted efficiently thereby improving fuel economy. In addition, damage on the switching mechanism can be limited and a drive force for propelling the hybrid vehicle can be increased. Further, the pinion gears of the planetary gear unit serving as the differential mechanism can be prevented from being rotated at an excessively high speed.

In addition to the above-explained advantage, according to the embodiment of the present application, the control to maintain the operating mode of the switching mechanism before and after starting the engine by the first motor, and the control to increase the rotational speed of the engine to the level at which combustion of the engine can be maintained are executed in the case that the speed of the hybrid vehicle is lower than the reference speed. By thus starting the engine while maintaining the operating mode of the switching mechanism, a predetermined rotary member of the differential mechanism or the switching mechanism may be increased to be higher than that of a case in which the engine is started while switching the operating mode. In order to prevent such disadvantage, according to the embodiment of the present application, the motoring of the engine is carried out when the vehicle speed is lower than the reference speed. For this reason, such excessive rise in the rotational speed of the rotary member can be prevented.

BRIEF DESCRIPTION OF THE DRAWINGS

Features, aspects, and advantages of exemplary embodiments of the present invention will become better understood with reference to the following description and accompanying drawings, which should not limit the invention in any way.

FIGS. 5a, 5b, 5c and 5d are nomographic diagrams showing conditions of the differential mechanism and the switching mechanism during execution of the engine starting control while propelling the vehicle in the forward direction in the EV mode;

DETAILED DESCRIPTION OF THE PREFERRED EMBODIMENT(S)

Figure 1:
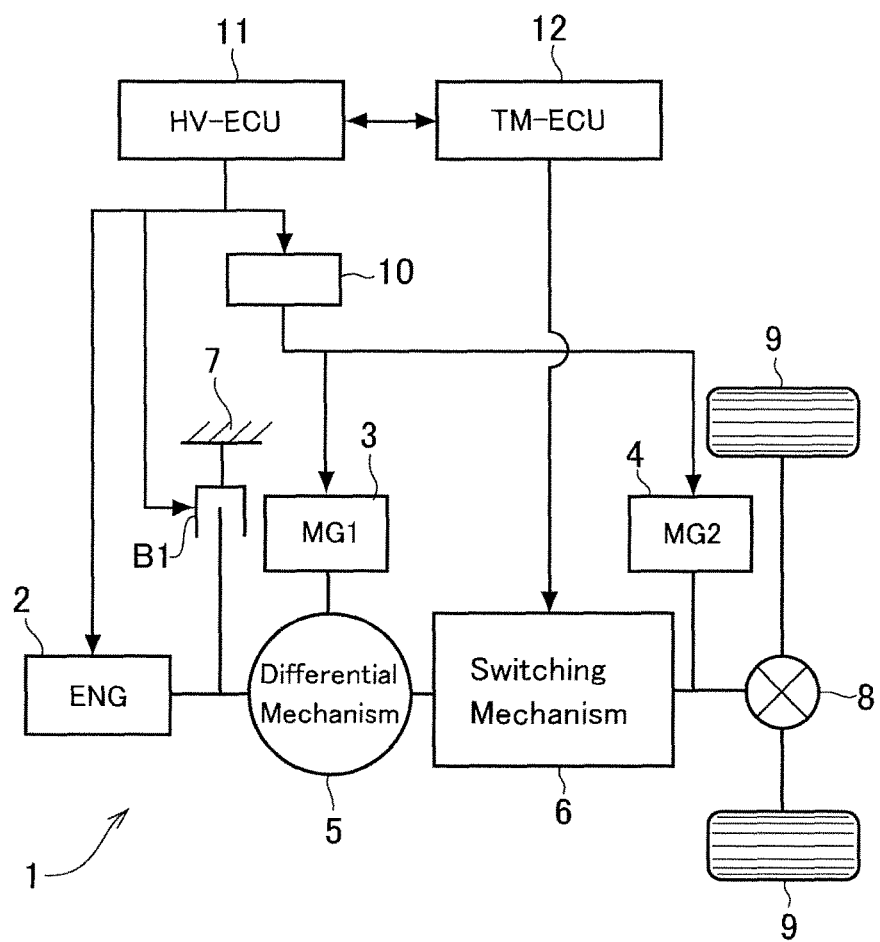
FIG. 1 is a schematic illustration showing one example of a hybrid vehicle to which the control system according to the embodiment is applied.

A preferred example of the present disclosure will now be explained in more detail with reference to the accompanying drawings. The engine starting control system according to the embodiment of the present application is applied to a hybrid vehicle having at least one motor and an engine to propel the vehicle. In the hybrid vehicle of this kind, the engine stopped in an electric vehicle mode (to be abbreviated as the "EV mode" hereinafter) is started by the motor. Turning now to FIG. 1, there is shown an example of the hybrid vehicle to which the engine starting control system is applied. As illustrated in FIG. 1, the hybrid vehicle 1 is provided with an engine (ENG) 2, a first motor (MG1) 3 and a second motor (MG2) 4. Specifically, the engine 2 is a conventional internal combustion engine such as a gasoline engine and a diesel engine, and the engine 2 is started by the motor. On the other hand, each of the motor 3 and 4 is a power unit rotated to generate a driving force by supplying current thereto. In the preferred embodiment, a motor-generator having a generating function is used as each of the motor 3 and 4.

Figure 2:
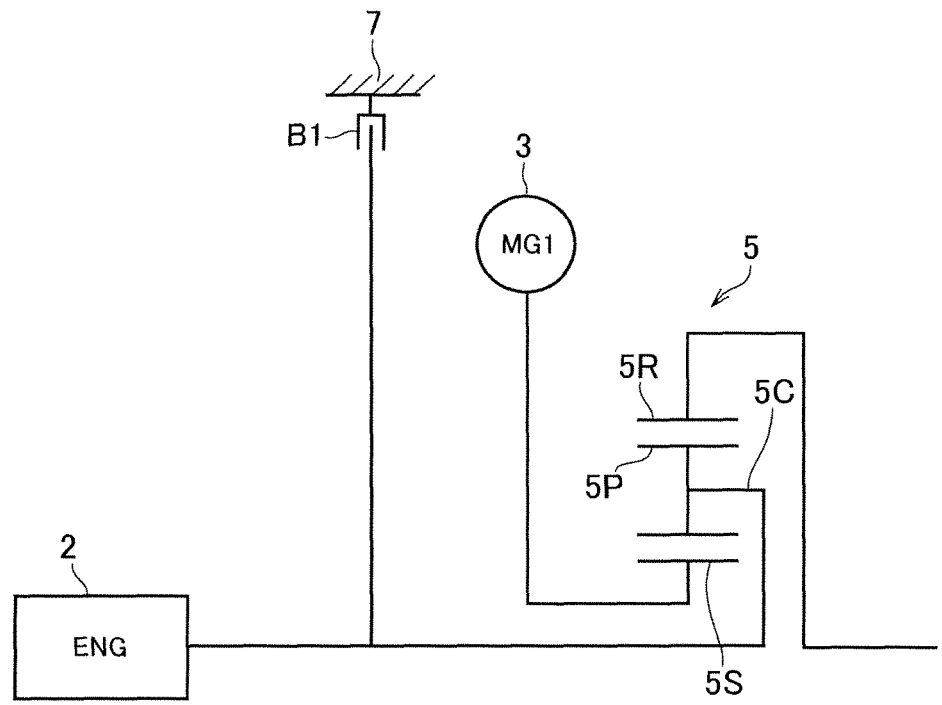
FIG. 2 is a schematic illustration showing one example of a differential mechanism of the hybrid vehicle.

The engine 2 and the first motor 3 are connected to a differential mechanism 5 adapted to perform a differential action among three rotary elements thereof. In the differential mechanism 5, specifically, a first rotary element is connected to the engine 2, a second rotary element is connected to the first motor 3, and a third rotary element outputs drive torque. According to the preferred embodiment, a single-pinion planetary gear unit shown in FIG. 2 is used as the differential mechanism 5. As shown in FIG. 2, the differential mechanism 5 comprises a sun gear 5S, a ring gear 5R arranged concentrically with the sun gear 5S, a plurality of pinion gear 5P interposed between the sun gear 5S and the ring gear 5R, and a carrier 5C supporting the pinion gear 5P. According to the preferred embodiment, the carrier 5C serving as a first rotary element is connected to the engine 2, the sun gear 5S serving as a second rotary element is connected to the first motor 3, and the ring gear 5R serves as a third rotary element.

In the differential mechanism 5, torque is applied to any one of the rotary elements, and another rotary element establishes a reaction force to rotate still another rotary element by the torque being increased or decreased. Specifically, when the hybrid vehicle 1 is powered by the engine 1, the first motor 3 serves as a generator to apply a reaction torque to the sun gear 5S, and the torque is outputted from the ring gear 5R. That is, during propelling the hybrid vehicle 1 by a power generated by the engine 1, the carrier 5C serves as an input element, the sun gear 5S serves as a reaction element, and the ring gear 5R serves as an output element. By contrast, when the hybrid vehicle 1 is powered by the first motor 3, the sun gear 5S connected to the first motor 3 serves as the input element, the ring gear 5R serves as the output element, and the carrier 5S serves as the reaction element. In this case, the engine 2 is subjected to a counter torque (i.e., a torque in an opposite direction to a rotational direction of the engine 2). In order to prevent the engine 2 to be rotated in the counter direction, and to allow the carrier 5C to establish a reaction force, a rotation of an output shaft of the engine 2 connected to the carrier 5C is selectively stopped or restricted by a brake B1 as a stopping member. For example, a friction brake and a dog clutch may be used as the brake B1. In a case of using the friction brake as the brake B1, the rotation of the output shaft of the engine 2 connected to the carrier 5C may be restricted by engaging the brake B1 while causing a slip. In other words, it is possible to apply a braking force to the output shaft of the engine 2 while allowing to slightly rotate together with the carrier 5C. By contrast, in a case of using the dog clutch as the brake B1, the rotation of the output shaft of the engine 2 is stopped by engaging the brake B1, and the output shaft of the engine 2 is allowed to rotate by releasing the brake B1.

Figure 3:
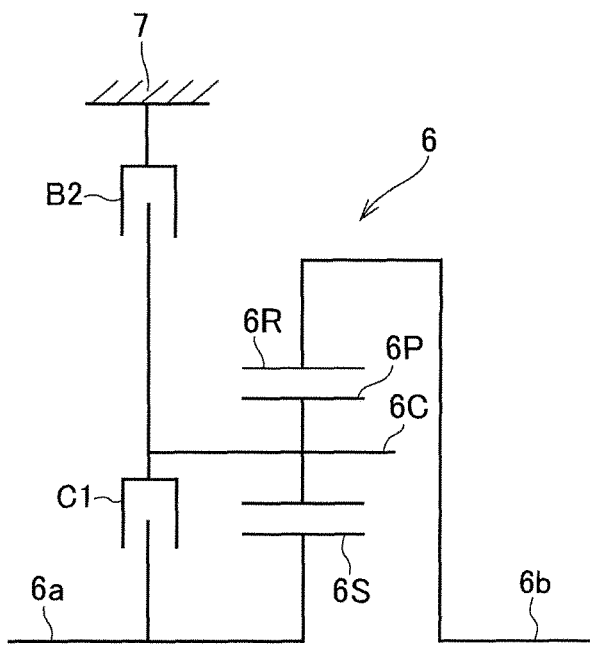
FIG. 3 is a schematic illustration showing one example of a switching mechanism of the hybrid vehicle.

Turing to FIG. 3, there is shown one example of a switching mechanism 6 connected to an output side of the differential mechanism 5. The switching mechanism 6 comprises an input member 6a connected to the ring gear 5R as the output element of the differential mechanism 5 to be rotated integrally therewith, and an output member 6b. An operating mode of the switching mechanism 6 is shifted between a first mode in which the input member 6a and the output member 6b are rotated in the same direction, and a second mode in which the input member 6a and the output member 6b are rotated in opposite directions. As illustrated in FIG. 3, the switching mechanism 6 includes a single-pinion planetary gear unit and two engagement devices. Specifically, the planetary gear unit of the switching mechanism 6 comprises a sun gear 6S, a ring gear 6R arranged concentrically with the sun gear 6S, a plurality of pinion gear 6P interposed between the sun gear 6S and the ring gear 6R, and a carrier 6C supporting the pinion gear 6P. The input member 6a is connected to the sun gear 6S, and the output member 6b is connected to the ring gear 6R.

In order to selectively connect the sun gear 6S to the carrier 6C, a clutch C1 that is actuated hydraulically or electromagnetically is disposed between the sun gear 6S and the carrier 6C. When the clutch C1 is engaged, the sun gear 6S and the carrier 6C are rotated integrally so that the planetary gear unit is rotated integrally. That is, the first mode of the switching mechanism 6 is established by engaging the clutch C1. In addition, a brake B2 is disposed between the carrier 6C and a stationary member 7 such as a casing to selectively halt the carrier 6C. For example, a friction brake and a dog clutch that is actuated hydraulically or electromagnetically may also be used as the brake B2. When the clutch B2 is engaged, the rotation of the carrier 6C is stopped so that the sun gear 6S and the carrier 6C are rotated in opposite directions. Thus, the second mode of the switching mechanism 6 is established by engaging the brake B2.

The output member 6b of the switching mechanism 6 is connected to a differential gear unit 8 as a final reduction, and the differential gear unit 8 is connected to drive wheels 9. That is, the ring gear 5R of the differential mechanism 5 is connected to the drive wheels 9 through the switching mechanism 6 and the differential gear unit 8. Here, not only front wheels but also rear wheels of the hybrid vehicle 1 may serve as the drive wheels. The second motor 4 is also connected to the output member 6b of the switching mechanism 6 to deliver drive torque to the drive wheels 9. The second motor 4 is adapted to generate drive torque for propelling the hybrid vehicle 1, and to regenerate energy when the hybrid vehicle 1 is decelerated. In the hybrid vehicle 1, the drive torque generated by the second motor 4 may also be delivered to wheels other than the drive wheels 9. For example, given that the front wheels serve as the drive wheels 9, the drive torque of the second motor 4 may be delivered to the rear wheels. By contrast, given that the rear wheels serve as the drive wheels 9, the drive torque of the second motor 4 may be delivered to the front wheels.

The first motor 3 and the second motor 4 are connected to a power source 10 including a battery and an inverter (neither of which are shown). An electric power of the power source 10 is supplied to the first motor 3 and the second motor 4 to generate drive torque. Electricity generated by one of the motors 3 and 4 may be supplied not only to the other motor 3 or 4 but also to the battery. In order to control power supply to/from the power source 10, activation of the engine 2, and actuation of the brake B1, a hybrid vehicle electronic control unit (to be abbreviated as the "HV-ECU" hereinafter) 11 is connected to the power source 10. The HV-ECU 11 is composed mainly of a microcomputer, and configured to execute a calculation based on incident data about a position of an accelerator pedal, a vehicle speed, a state of charge (to be abbreviated as the "SOC" hereinafter) of the battery etc., and data installed in advance, and to transmit a calculation result to the power source 10, the engine 2, or the brake B1 in the form of command signal.

In addition, in order to switch the operating mode of the switching mechanism 6 between the first mode and the second mode, a transmission electronic control unit (to be abbreviated as the "TM-ECU" hereinafter) 12 is connected to the switching mechanism 6. The TM-ECU 12 is also composed mainly of a microcomputer, and configured to execute a calculation based on incident data and data installed in advance, and to transmit a calculation result to the switching mechanism 6 in the form of command signal.

Thus, the 1W-ECU 11 and the TM-ECU 12 serve as a controller of the hybrid vehicle 1. Optionally, the HV-ECU 11 and the TM-ECU 12 may be integrated according to need.

The hybrid vehicle 1 may be propelled in the EV mode in which the hybrid vehicle 1 is powered by the second motor 4 or by both of the first motor 3 and the second motor 4 while stopping the engine 2. During propulsion in the EV mode, the engine 2 will be started when the SOC level becomes lower than a predetermined level, and when the accelerator pedal is depressed deeper than a predetermined degree to generate driving force larger than a maximum possible value in the EV mode to satisfy acceleration demand of a driver. In order to start the engine during propulsion in the EV mode, the controller is configured to execute a control shown in FIG. 4.

First of all, at step S1, it is determined whether or not the engine 2 is required to be started. As described, a starting condition of the engine 2 is satisfied when the SOC level of the battery falls below the predetermined level or when the accelerator pedal is depressed deeper than the predetermined degree. Accordingly, the determination at step S1 may be made based on the SOC level of the battery or the position of the accelerator pedal. If the answer of step S1 is NO, the routine is returned without carrying out any specific control.

By contrast, if the answer of step S1 is YES, the routine progresses to step S2 to determine whether or not the hybrid vehicle 1 is propelled in the forward direction and the switching mechanism 6 is in the second mode, or whether or not the hybrid vehicle 1 is propelled in the reverse direction and the switching mechanism 6 is in the first mode. The determination at step S2 may be made based on the control signals transmitted from the HV-ECU 11 and the TM-ECU 12, or detection signals of conditions of the motors 3 and 4 and the switching mechanism 6.

Figure 6A:
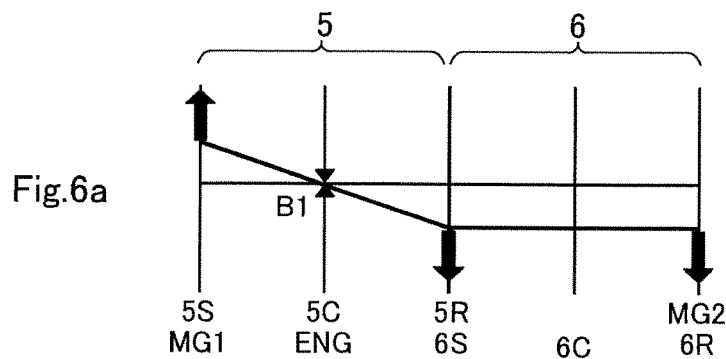
FIGS. 6a, 6b, 6c and 6d are nomographic diagrams showing conditions of the differential mechanism and the switching mechanism during execution of the engine starting control while propelling the vehicle in the reverse direction in the EV mode.

The operating conditions determined at step S2 are indicated in FIGS. 5a and 6a. In FIGS. 5a, 5b, 5c, 5d, 6a, 6b, 6c, and 6d, the right part of each nomographic diagram indicates rotational speeds of the rotary elements of the switching mechanism 6, and the left part of each nomographic diagram indicates rotational speeds of the rotary elements of the differential mechanism 5. In the nomographic diagrams shown in FIGS. 5a, 5b, 5c, 5d, 6a, 6b, 6c, and 6d, specifically, the vertical lines represent rotary elements, and a vertical position on each of the vertical line represents a rotational speed of the rotary element. Arrows in FIGS. 5a, 5b, 5c, 5d, 6a, 6b, 6c, and 6d individually represent a direction of the torque applied to the rotary element from the first motor 3, the second motor 4 or the engine 2.

FIG. 5a indicates a situation in which the hybrid vehicle 1 is propelled in the forward direction in the EV mode, and in which the switching mechanism 6 is in the second mode. In this situation, the ring gear 6R integrated with the output member 6b is rotated in the forward direction (i.e., a rotational direction of the engine 2), and since the rotation of the carrier 6C is stopped by the brake B2, the sun gear 6S integrated with the input member 6a is rotated in the counter direction. Meanwhile, in the differential mechanism 5, the rotation of the carrier 5C connected to the engine 2 is stopped or restricted by the brake B1 so that the sun gear 5S and the first motor 3 connected thereto are rotated in the forward direction by a counter rotation of the ring gear 5R connected to the input member 6a. Consequently, the first motor 3 generates forward torque.

On the other hand, FIG. 6a indicates a situation in which the hybrid vehicle 1 is propelled in the reverse direction in the EV mode, and in which the switching mechanism 6 is in the first mode. In this situation, the ring gear 6R integrated with the output member 6b is rotated in the counter direction, and since the clutch C1 is engaged to rotate the switching mechanism 6 integrally, the sun gear 6S integrated with the input member 6a and the carrier 6C are rotated in the counter direction. Meanwhile, in the differential mechanism 5, the rotation of the carrier 5C connected to the engine 2 is also stopped or restricted by the brake B1 so that the sun gear 5S and the first motor 3 connected thereto are rotated in the forward direction by the counter rotation of the ring gear 5R connected to the input member 6a. Consequently, the first motor 3 generates forward torque.

If the answer of step S2 is YES, the routine progresses to step S3 to determine whether or not a vehicle speed V is equal to or lower than a reference speed V0. Such determination at step S3 is carried out to determine whether or not a rotational speed of a predetermined rotary element of the differential mechanism 5 or the switching mechanism 6 (e.g., the pinion gear 5P or the pinion gear 6P) higher than a structurally allowable speed. To this end, the reference speed V0 is determined based on a result of experimentation or simulation, and a gear ratio of the power transmission route.

Figure 6B:
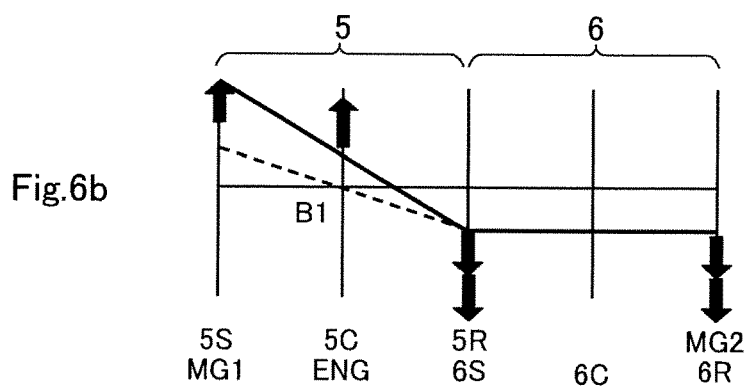

If the answer of step S3 is YES, the routine progresses to step S4 to start the engine 2 by the first motor 3. Such motoring of the engine 2 is continued until completion of ignition of the engine 2 while keeping the operating condition of the switching mechanism 6. Specifically, the engine 2 is started by releasing the brake B1 to allow the engine 2 and the carrier 5C of the differential mechanism 5 to rotate, while increasing the forward torque of the first motor 3. Operating conditions of the differential mechanism 5 and the switching mechanism 6 in this situation are indicated in FIGS. 5b and 6b. Consequently, a rotational speed of the engine 2 is raised to an ignition speed as a self-sustaining speed possible to maintain combustion of the engine 2.

Specifically, FIG. 5b indicates a situation during motoring of the engine 2 in which the hybrid vehicle 1 is propelled in the forward direction in the EV mode. When the forward torque of the first motor 3 connected to the sun gear 5S of the differential mechanism 5 is increased, the ring gear 5R establishes a reaction so that the forward torque is delivered to the carrier 5C. In this situation, the brake B1 is released so that the carrier 5C and the engine 2 connected thereto are rotated in the forward direction. Meanwhile, in the switching mechanism 6, the brake B2 is in engagement to establish the second mode. In the switching mechanism 6, therefore, the counter torque is applied to the sun gear 6S connected to the sun gear 5S through the input ember 6a. Consequently, the forward torque is applied to the ring gear 6R, and the drive torque delivered from the ring gear 6R through the output member 6b is increased with an increase in the output torque of the first motor 3.

FIG. 6b indicates a situation during motoring of the engine 2 in which the hybrid vehicle 1 is propelled in the reverse direction in the EV mode. When the forward torque of the first motor 3 connected to the sun gear 5S of the differential mechanism 5 is increased, the ring gear 5R also establishes a reaction so that the forward torque is delivered to the carrier 5C. In this situation, the brake B1 is also released so that the carrier 5C and the engine 2 connected thereto are rotated in the forward direction. Meanwhile, in the switching mechanism 6, the clutch C1 is in engagement to establish the first mode. In the switching mechanism 6, therefore, the counter torque is applied to the sun gear 6S connected to the sun gear 5S through the input ember 6a. Consequently, the switching mechanism 6 is rotated integrally in the counter direction and hence the counter torque is applied to the ring gear 6R connected to the output member 6b. In this case, the drive torque delivered from the ring gear 6R through the output member 6b is also increased with an increase in the output torque of the first motor 3.

After the completion of ignition of the engine 2, the routine progresses to step S5 to switch the operating mode of the switching mechanism 6. Specifically, in the case of propelling the hybrid vehicle 1 in the forward direction, the operating mode of the switching mechanism is switched from the second mode to the first mode. By contrast, in the case of propelling the hybrid vehicle 1 in the reverse direction, the operating mode of the switching mechanism is switched from the first mode to the second mode. Operating conditions of the differential mechanism 5 and the switching mechanism 6 in this situation are indicated in FIGS. 5c and 6c.

Specifically, FIG. 5c indicates a situation in which the operating mode of the hybrid vehicle 1 is switched from the EV mode to a hybrid vehicle mode (to be abbreviated as the "HV mode" hereinafter) by starting the engine 2 during forward propulsion, and hence the operating mode of the switching mechanism 6 is switched from the second mode to the first mode. In this case, the operating mode of the switching mechanism 6 is switched from the second mode to the first mode by disengaging the brake B2 while engaging the clutch C1. Consequently, the switching mechanism 6 is rotated integrally so that the rotational direction of the sun gear 6S is switched from the counter direction to the forward direction, and a rotational speed of the sun gear 6S is increased to that of the ring gear 6R. Meanwhile, in the differential mechanism 5, a rotational speed of the carrier 5C is increased to the ignition speed of the engine 2. In this situation, in order to maintain the rotational speeds of the ring gear 6R (or the sun gear 6S), a rotational speed of the first motor 3 connected to the sun gear 5S is lowered from the speed before switching the operating mode of the switching mechanism 6 to the first mode.

Figure 6C:
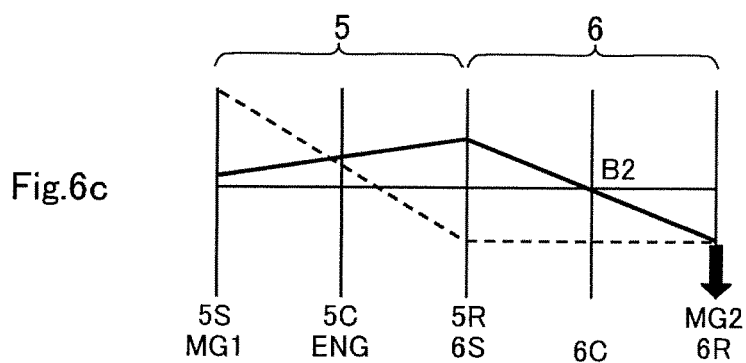

FIG. 6c indicates a situation in which the operating mode of the hybrid vehicle 1 is switched from the EV mode to the HV mode by starting the engine 2 during reverse propulsion, and hence the operating mode of the switching mechanism 6 is switched from the first mode to the second mode. In this case, the operating mode of the switching mechanism 6 is switched from the first mode to the second mode by disengaging the clutch C1 while engaging the brake B2. Consequently, the carrier 6C is halted so that the rotational direction of the sun gear 6S is switched from the counter direction to the forward direction, and a rotational speed of the sun gear 6S is increased to that of the ring gear 6R. Meanwhile, in the differential mechanism 5, a rotational speed of the first motor 3 connected to the sun gear 5S is also lowered from the speed before switching the operating mode of the switching mechanism 6 to the second mode.

After switching the operating mode of the switching mechanism 6, the routine progresses to step S6 to generate torque by the engine 2. After igniting the engine 2, the engine 2 starts rotating autonomously. That is, the engine 2 idles at the self-sustaining speed while generating torque in accordance with an air intake. At step S6, the torque of the engine 2 is increased from the idling torque to the torque required to generate electric power and to accelerate the hybrid vehicle 1. Then, the routine is returned.

FIG. 5d indicates a situation in which the engine 2 generates torque during forward propulsion. In this situation, in the differential mechanism 5, the forward torque of the engine 2 is applied to the carrier 5C, a load for propelling the hybrid vehicle 1 in the forward direction (i.e., a counter torque) is applied to the ring gear 5R, and the counter torque resulting from generating electricity by the first motor 3 is applied to the sun gear 5S. That is, a rotational speed of the engine 2 is controlled by the first motor 3. Consequently, the forward torque is applied to the ring gear 5R and further applied to the switching mechanism 6 connected to the ring gear 5R. Since the switching mechanism 6 is rotated integrally by engaging the clutch C1, the forward torque of the output member 6b is delivered to the drive wheels 9. In this situation, the electricity generated by the first motor 3 is supplied to the second motor 4 to generate drive torque by the second motor 4. In this case, since the switching mechanism 6 is rotated integrally without causing a relative rotation among the rotary elements, a power loss such as a frictional loss can be reduced even if the engine 2 generates a large torque during forward propulsion, and damage on the switching mechanism 6 can be limited.

Figure 6D:
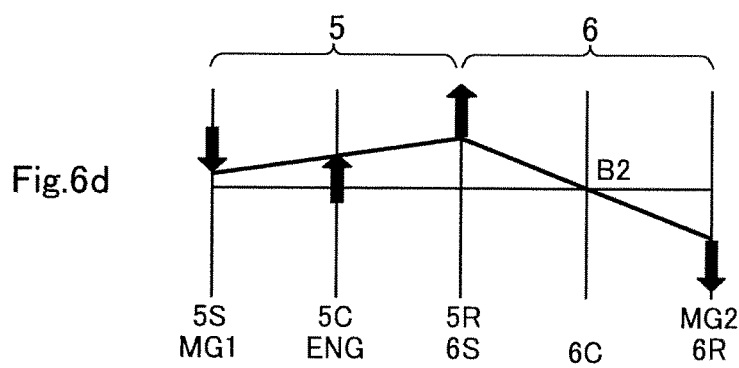

FIG. 6d indicates a situation in which the engine 2 generates torque during reverse propulsion. In this case, an operating condition of the differential mechanism 5 is identical to that indicated in FIG. 5d. The operating mode of the switching mechanism 6 is switched to the second mode, and the forward torque is applied to the sun gear 6S. Consequently, the counter torque reversed by the switching mechanism 6 is applied to the ring gear 6R and the output member 6b integrated therewith, and the counter torque is further delivered to the drive wheels 9. As described with reference to FIG. 3, the planetary gear unit is used as the switching mechanism 6, and in this situation, the switching mechanism 6 serves as a speed reducing device in which a speed ratio thereof is larger than "1". In the switching mechanism 6, therefore, the rotational speed on the input member 6a is increased to be higher than that of the output member 6b, and the drive torque for propelling the hybrid vehicle 1 in the reverse direction can be increased.

By contrast, if the answer of step S2 is NO, the routine progresses to step S7 to start the engine 2 by other method.

For example, in a case that the hybrid vehicle 1 is propelled in the forward direction in the EV mode and the switching mechanism 6 is in the first mode, the motoring of the engine 2 by the first motor 3 and the ignition of the engine 2 are executed immediately, and the routine progresses to step S6 to increase the torque of the engine 2. As a result of the motoring of the engine 2, the counter torque is applied to the input member 6a of the switching mechanism 6 thereby reducing the drive torque to propel the hybrid vehicle 1 in the forward direction. Likewise, in a case that the hybrid vehicle 1 is propelled in the reverse direction in the EV mode and the switching mechanism 6 is in the second mode, the motoring of the engine 2 by the first motor 3 and the ignition of the engine 2 are also executed immediately, and the routine also progresses to step S6 to increase the torque of the engine 2. As a result of the motoring of the engine 2, the counter torque is also applied to the input member 6a of the switching mechanism 6, and then reversed into the forward torque by the switching mechanism 6. Consequently, the drive torque to propel the hybrid vehicle 1 in the reverse direction is reduced. Thus, at step S7, the drive torque for propelling the hybrid vehicle 1 is reduced temporarily. However, since the engine 2 is allowed to be started immediately without switching the operating mode of the switching mechanism 6, it is possible to prevent delay in startup of the engine 2.

Likewise, if the vehicle speed V is higher than the reference speed V0 so that the answer of step S3 is NO, the routine also progresses to step S7 to start the engine 2 by other method. In this case, the rotary elements of the differential mechanism 5 and the switching mechanism 6 are rotated at high speeds, and hence the differential mechanism 5 and the switching mechanism 6 may be damaged by switching the operating mode of the switching mechanism 6. In this case, therefore, the engine 2 is started without switching the operating mode of the switching mechanism 6.

Figure 7:
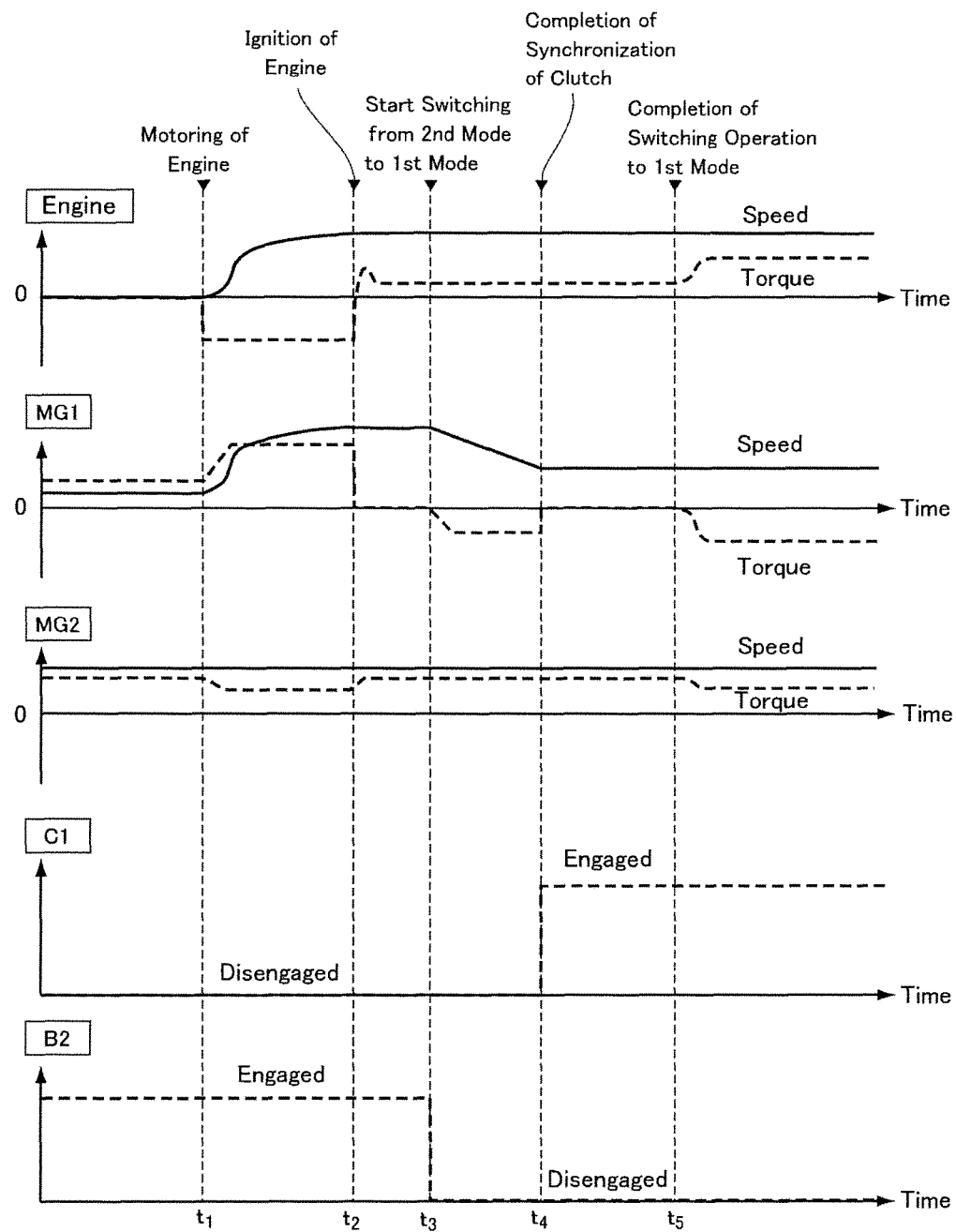
FIG. 7 is a time chart showing changes in speeds and torques of the engine and the motors, and operating conditions of a clutch and a brake, during execution of the engine starting control while propelling the vehicle in the forward direction in the EV mode.

Turning to FIG. 7, there are shown changes in speeds and torques of the engine 2 and the motors 3 and 4 during startup of the engine 2 in the case that the hybrid vehicle 1 is propelled in the forward direction in the EV mode, and in which the switching mechanism 6 is in the second mode. Before point t1, the hybrid vehicle 1 is propelled by the forward torques of the first motor 3 and the second motor 4 while stopping the engine 2. In this situation, the clutch C1 is disengaged and the brake B2 is engaged.

When the first motor 3 generates torque for cranking the engine 2 at point t1, a rotational speed of the engine 2 is increased gradually. Consequently, torque of the engine 2 is reversed into the counter torque by friction torque and inertia torque, and the torque of the first motor 3 is changed in an amount required to start the engine 2. Here, it is to be noted that the current output torque of the first motor 3 propelling the hybrid vehicle 1 may be larger than the torque required to crank the engine 2, therefore, the torque of the first motor 3 may be not only increased but also decreased as a result of cranking the engine 2.

In this situation, a rotational speed of the second motor 4 is maintained in accordance with the vehicle speed V. That is, the rotational speed of the second motor 4 is kept constant unless the vehicle speed V is changed. However, the friction torque and the inertia torque may serve as a drive force. In this case, torque of the second motor 4 is reduced in accordance with the friction torque and the inertia torque.

When the speed of the engine 2 reaches the ignition speed at point t2, the engine 2 is ignited to generate torque. Specifically, the torque of the engine 2 is increased by an initial combustion, and maintained to an idling torque. After thus cranking the engine 2, the torque of the first motor 3 is reduced to a predetermined value (e.g., to zero). In this situation, the first motor 3 is rotated passively by the engine 2 and hence the speed of the first motor 3 is maintained to the current speed. Meanwhile, the friction torque and the inertia torque are eliminated and hence the torque of the second motor 4 is increased to the previous level.

After igniting the engine 2, the operating mode of the switching mechanism 6 is switched at point t3. In the example shown in FIG. 7, specifically, the operating mode of the switching mechanism 6 is switched from the second mode to the first mode by disengaging the brake B2 while engaging the clutch C1. In this situation, if torque transmitting capacities of both of the brake B2 and the clutch C1 are greater than a predetermined value, a so-called tie-up condition of the those engagement devices is caused to restrict a rotation of the switching mechanism 6. In order to avoid such disadvantage, a command signal to disengage the brake B2 is transmitted prior to a command signal to engage the clutch C1. For example, a synchronization of the clutch C1 in which a speed difference between an input member and an output member is reduced to a predetermined value may be caused by a speed change resulting from disengagement of the brake B2. In this case, the clutch C1 may be engaged when the synchronization thereof is caused.

After disengaging the brake B2, the first motor 3 generates counter torque to achieve synchronization of the clutch C1 to increase a rotational speed of the ring gear 5R integrated with the sun gear 6S by lowering a rotational speed of the sun gear 5S, as explained with reference to FIGS. 5c and 6c. Consequently, rotational speeds of the input member (i.e., a drive member) and the output member (i.e., a driven member) of the clutch C1 are synchronized with each other. When the synchronization of the clutch C1 is completed at point t4, the torque of the first motor 3 is reduced to a predetermined value (e.g., to zero). For example, the completion of synchronization of the clutch C1 may be made based on detection values of rotational speeds of the input member 6a and the output member 6b of the switching mechanism 6.

Then, completion of the switching operation of the switching mechanism 6 to the first mode is determined at point t5. Specifically, the first mode is established by engaging the clutch C1 completely, therefore, the determination of completion of the switching operation to the first mode is made on the basis of a fact that an engagement force (e.g., hydraulic pressure) applied to the clutch C1 is stabilized. For this reason, the determination of completion of the switching operation to the first mode is made at point t5 based on a fact that a predetermined period of time has elapsed from the completion of synchronization of the clutch C1 at point t4. Alternatively, the completion of the switching operation to the first mode may also be determined based on a detection signal of hydraulic pressure applied to the clutch C1 or rotational speed of rotary member of the clutch C1, in addition to or instead of the lapse of the predetermined period of time.

After switching the operating mode of the switching mechanism 6 to the first mode, the engine 2 starts generating torque. Specifically, as described, the output torque of the engine 2 is increased from the idling torque to the required torque governed by a position of the accelerator pedal. In this situation, a target speed of the engine 2 is determined in line with an optimum fuel efficient curve, and the rotational speed of the first motor 3 is controlled in such a manner as to achieve the target speed of the engine 2. In the example shown in FIG. 7, specifically, the first motor 3 is operated as a generator to establish a counter torque so that the speed of the engine 2 is controlled in accordance with the speed of the first motor 3. The electricity generated by the first motor 3 is supplied to the second motor 4 to generate required torque by the second motor 4.

Thus, the control system according to the preferred embodiment is configured to start the engine 2 by the first motor 3 in a case that the hybrid vehicle 1 is propelled in the forward direction in the EV mode and that the switching mechanism 6 is in the second mode, or in a case that the hybrid vehicle is propelled in the reverse direction in the EV mode and that the switching mechanism 6 is in the first mode. According to the preferred embodiment, therefore, the output torque of the first motor 3 is applied to the drive wheels 9 in the current travelling direction. For this reason, a temporal drop in the drive force can be prevented when starting the engine 2.

As described, according to the preferred embodiment, the output torque of the engine 2 is increased to the required torque after switching the operating mode of the switching mechanism 6, and the switching mechanism 6 may serves as a speed reducing device to increase the output torque of the first motor 3 when cranking the engine 2 by the first motor 3. According to the preferred embodiment, therefore, a temporal drop in the drive force can be prevented certainly when starting the engine 2.

When increasing the output torque of the engine 2 to the target torque after starting the engine 2, the switching mechanism 6 is rotated integrally without causing a relative rotation among the rotary elements. According to the preferred embodiment, therefore, a power loss such as a frictional loss can be reduced to improve fuel efficiency. In addition, even if the engine 2 generates a large torque to propel the hybrid vehicle 1 in the forward direction, damage on the switching mechanism 6 can be limited.

Figure 4:
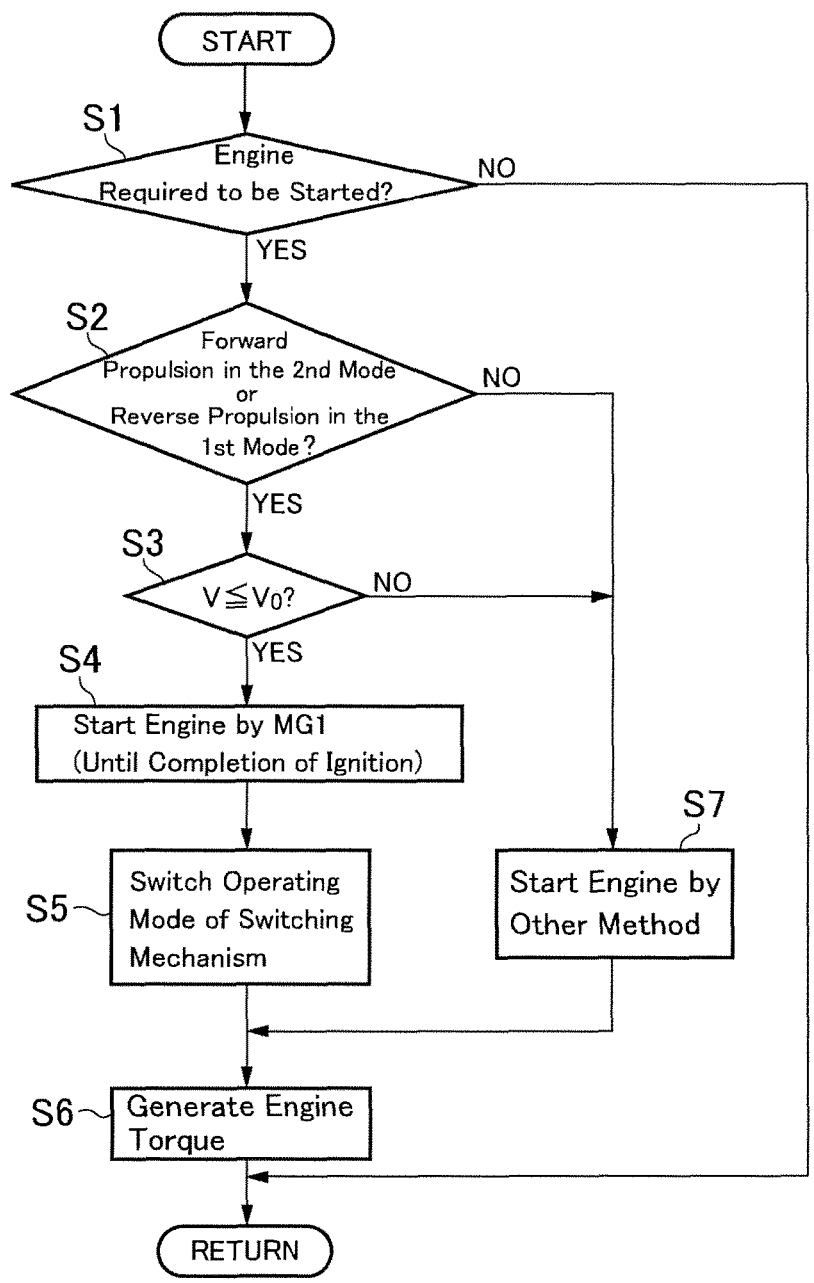
FIG. 4 is a flowchart showing one example of an engine starting control executed by the control system.

As also described, in the case that the vehicle speed V is lower than the reference speed V0, the control system according to the preferred embodiment executes the control of steps S4 and S5 of the routine shown in FIG. 4. According to the preferred embodiment, therefore, a temporal drop in the drive force can be prevented to reduce uncomfortable feeling when starting the engine 2. For this reason, drivability of the hybrid vehicle will not be deteriorated even when starting the engine 2. By contrast, in the case that the vehicle speed V is lower than the reference speed V0, the motoring of the engine 2 is commenced immediately without switching the operating mode of the switching mechanism 6. In this case, therefore, the engine 2 can be started promptly.

As also described, when starting the engine 2 during reverse propulsion in the EV mode, the operating mode of the switching mechanism is switched after igniting the engine 2. In this case, therefore, the output torque of the engine 2 can be applied to the drive wheels 9 to propel the hybrid vehicle 1 in the reverse direction. For this reason, the drive force for propelling the hybrid vehicle 1 in the reverse direction may be increased. In addition, since the first motor 3 will not be operated at high speed, the pinion gears 5P of the differential mechanism can be prevented from being rotated at high speed. For this reason, damage on the differential mechanism 5 may be limited.

Figure 8A:
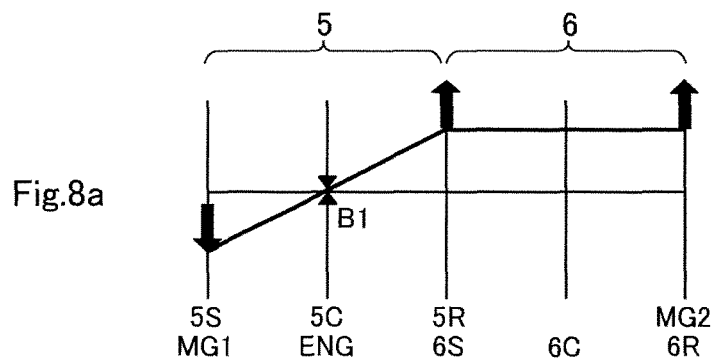
FIGS. 8a and 8b are nomographic diagrams showing conditions of the differential mechanism and the switching mechanism during forward propulsion in the EV mode.

FIG. 8a shows operating conditions of the differential mechanism 5 and the switching mechanism 6 in a case that the hybrid vehicle 1 is propelled in the forward direction in the EV mode and that the switching mechanism 6 is in the first mode. In this case, in the differential mechanism 5, the rotation of the carrier 5C is stopped or restricted by the brake B1, and the first motor 3 is rotated in the counter direction to establish the counter torque. Consequently, the ring gear 5R connected to the sun gear 6S of the switching mechanism 6 is rotated in the forward direction by the forward torque. In this case, since the clutch C1 is engaged to rotate the switching mechanism 6 integrally, the forward torque is applied to the ring gear 6R connected to the output member 6b to propel the hybrid vehicle 1 in the forward direction. In this situation, the second motor 4 generates the forward torque.

Figure 8B:
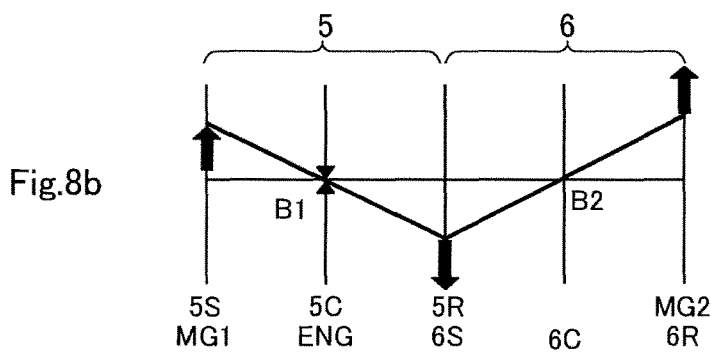

FIG. 8b shows operating conditions of the differential mechanism 5 and the switching mechanism 6 in a case that the hybrid vehicle 1 is propelled in the forward direction in the EV mode and that the switching mechanism 6 is in the second mode. In this case, in the differential mechanism 5, the rotation of the carrier 5C is stopped or restricted by the brake B1, and the first motor 3 is rotated in the forward direction to establish the forward torque. Consequently, the ring gear 5R connected to the sun gear 6S of the switching mechanism 6 is rotated in the reverse direction by the reverse torque. In this case, since the brake B1 is engaged to establish the second mode in the switching mechanism 6, the forward torque is applied to the ring gear 6R connected to the output member 6b to propel the hybrid vehicle 1 in the forward direction. In this situation, the second motor 4 generates the forward torque. In the case that the vehicle speed V is lower than the reference speed V0, the engine 2 is started in the situation shown in FIG. 8b.

Figure 9A:
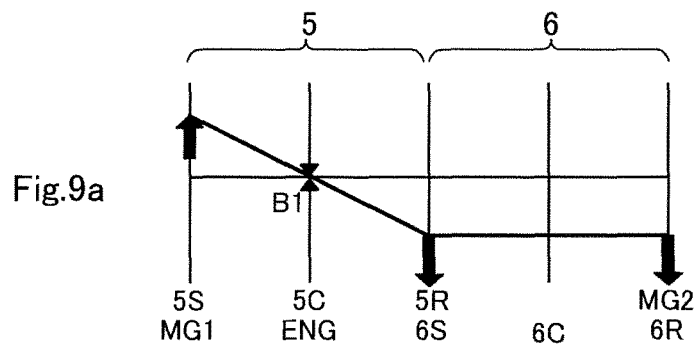
FIGS. 9a and 9b are nomographic diagrams showing conditions of the differential mechanism and the switching mechanism during reverse propulsion in the EV mode.
Figure 9B:
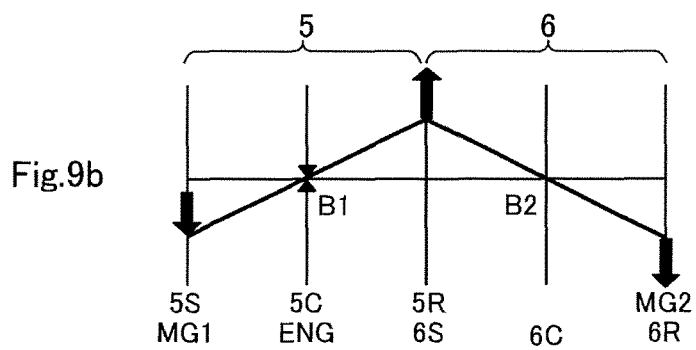

FIGS. 9a and 9b show operating conditions of the differential mechanism 5 and the switching mechanism 6 in a case that the hybrid vehicle 1 is propelled in the reverse direction in the EV mode and that the switching mechanism 6 is in the first mode. In this case, in the differential mechanism 5, the rotation of the carrier 5C is stopped or restricted by the brake B1, and the first motor 3 is rotated in the forward direction to establish the forward torque. Consequently, the ring gear 5R connected to the sun gear 6S of the switching mechanism 6 is rotated in the reverse direction by the reverse torque. In this case, since the clutch C1 is engaged to rotate the switching mechanism 6 integrally, the reverse torque is applied to the ring gear 6R connected to the output member 6b to propel the hybrid vehicle 1 in the reverse direction. In the case that the vehicle speed V is lower than the reference speed V0, the engine 2 is started in the situation shown in FIG. 9a.

FIG. 9b shows operating conditions of the differential mechanism 5 and the switching mechanism 6 in a case that the hybrid vehicle 1 is propelled in the reverse direction in the EV mode and that the switching mechanism 6 is in the second mode. In this case, in the differential mechanism 5, the rotation of the carrier 5C is stopped or restricted by the brake B1, and the first motor 3 is rotated in the reverse direction to establish the reverse torque. Consequently, the ring gear 5R connected to the sun gear 6S of the switching mechanism 6 is rotated in the forward direction by the forward torque. In this case, since the brake B1 is engaged to establish the second mode in the switching mechanism 6, the revere torque is applied to the ring gear 6R connected to the output member 6b to propel the hybrid vehicle 1 in the reverse direction. In this situation, the second motor 4 generates the counter torque.

Figure 10A:
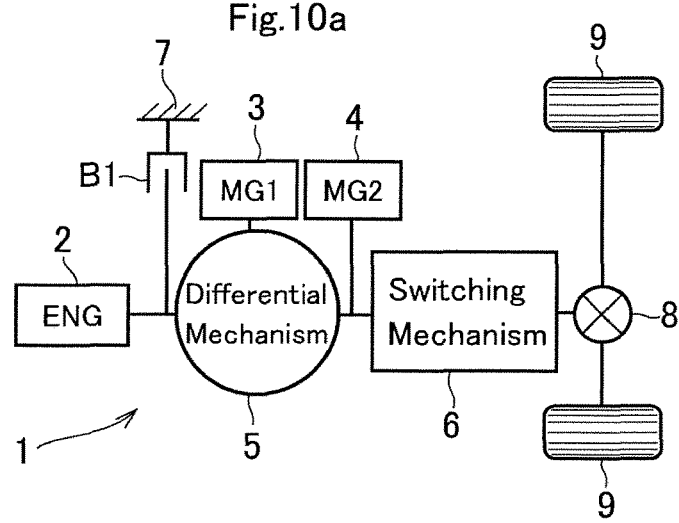
FIGS. 10a, 10b and 10c are schematic illustrations showing other examples of the hybrid vehicle to which the control system according to the embodiment is applied.
Figure 10B:
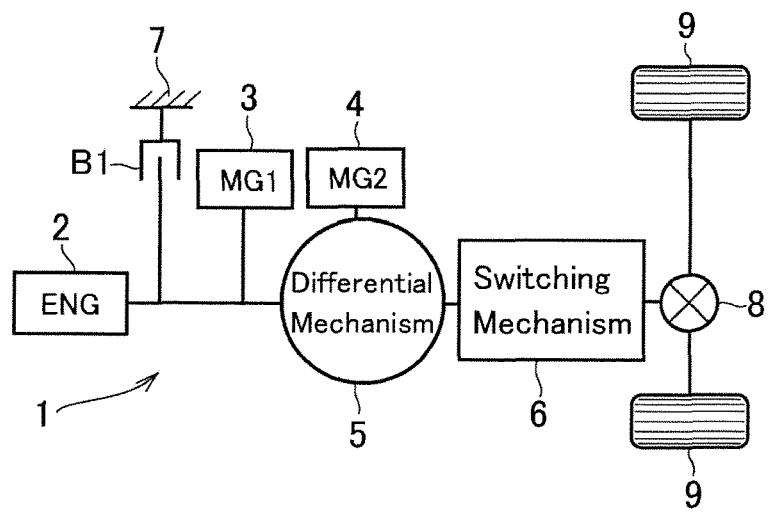
Figure 10C:
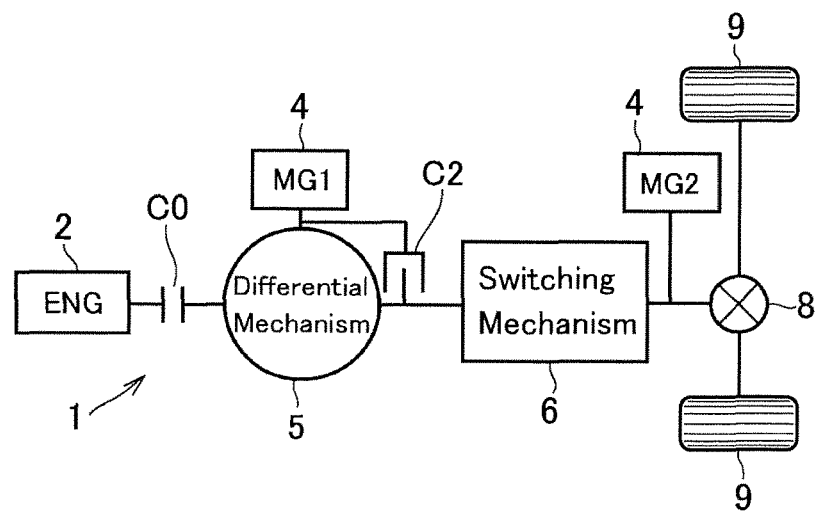

The engine starting control system according to the embodiment may also be applied to hybrid vehicles other than that shown in FIG. 1. Example of the hybrid vehicles to which the engine starting control system can be applied are shown in FIGS. 10a, 10b and 10c. In the example shown in FIG. 10a, the second motor 4 is disposed on an input side of the switching mechanism 6, and connected to the input member 6a of the switching mechanism 6. In the example shown in FIG. 10b, the second motor 4 is disposed on an input side of the differential mechanism 5, and connected to the output shaft of the engine 2 or the input element (e.g., the carrier 5C) of the differential mechanism 5. In the example shown in FIG. 10c, clutches C0 and C2 are used instead of the brake B1. Specifically, the clutch C0 is disposed between the engine 2 and the differential mechanism 5 to selectively provide a connection therebetween, and the clutch C2 is disposed between any two of the rotary elements of the differential mechanism 5. When the clutch C2 is in engagement, the differential mechanism 5 is rotated integrally to transmit torque of the first motor 3 to the switching mechanism 6 without changing and reversing. By contrast, when the clutch C2 is in disengagement, the differential mechanism 5 is allowed to perform a differential action.

Figure 11A:
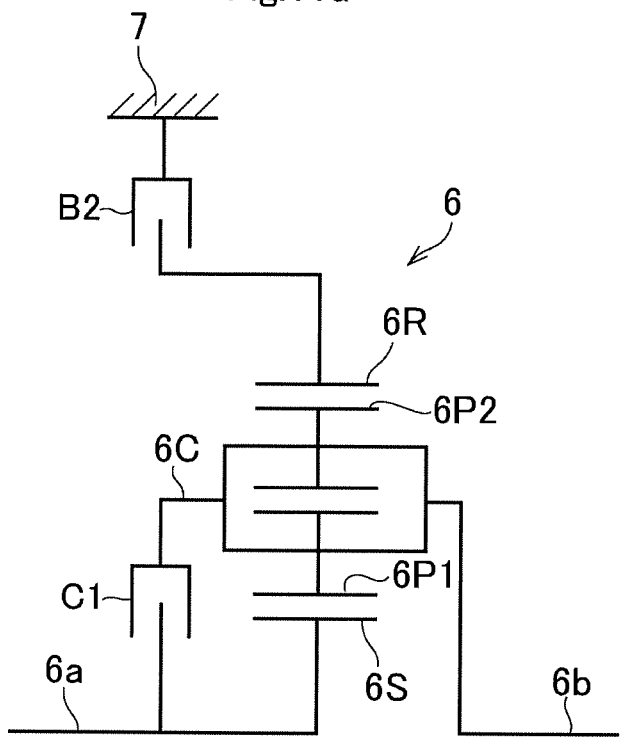
FIGS. 11a and 11b are schematic illustrations showing other examples of the switching mechanism of the hybrid vehicle.
Figure 11B:
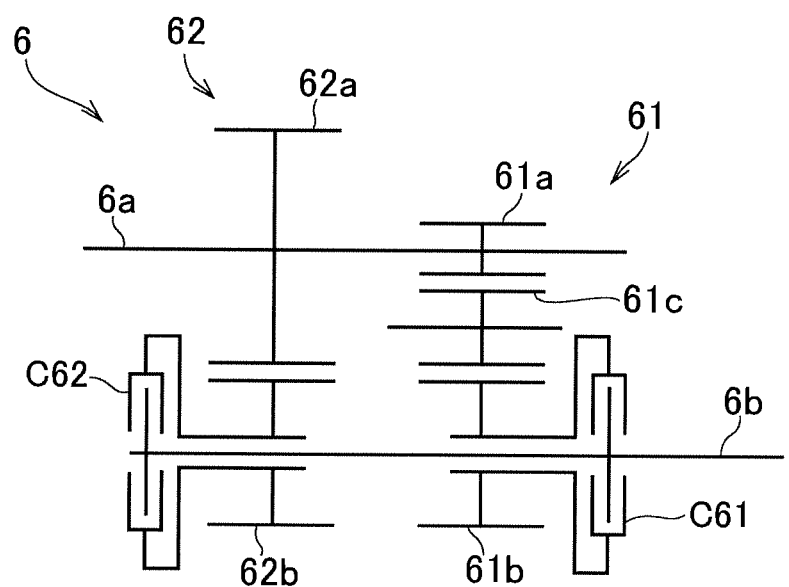

In the hybrid vehicle 1, a structure of the switching mechanism 6 may be altered as shown in FIGS. 11a and 11b. In the example shown in FIG. 11a, a double-pinion planetary gear unit is used as the switching mechanism 6 instead of the single-pinion planetary gear unit. In the example shown in FIG. 11a, specifically, a first set of pinion gears 6P1 and a second set of the pinion gears 6P2 are interposed between the sun gear 6S and the ring gear 6R while being supported by the carrier 6C. The output member 6b is connected to the carrier 6C instead of the ring gear 6R, and the brake B2 is disposed between the ring gear 6R and the stationary member 7 to selectively halt the ring gear 6R. As the example shown in FIG. 3, the clutch C1 is disposed between the carrier 6C and the input member 6a to selectively provide a connection between the clutch C1 and the input member 6a or the sun gear 6S. In the switching mechanism 6 shown in FIG. 11a, the first mode is established to rotate the switching mechanism 6 integrally by engaging the clutch C1. By contrast, the second mode is established to rotate the sun gear 6S connected to the input member 6a and the carrier 6C connected to the output member 6b in opposite directions, by disengaging the clutch C1 while engaging the brake B2.

Thus, in the first mode, the switching mechanism 6 shown in FIG. 11a is also rotated integrally without causing a relative rotation among the rotary elements. In the first mode, therefore, a power loss can be reduced to improve fuel efficiency. By contrast, in the second mode, the switching mechanism 6 also serves as a speed reducing device to increase a drive torque. As described, the reverse torque can be increased in the EV mode by establishing the second mode in the switching mechanism 6. For this reason, opportunities to propel the hybrid vehicle 1 in the reverse direction in the EV mode may be increased.

In the example shown in FIG. 11b, the switching mechanism 6 comprises a forward gear pair 61 and a reverse gear pair 62. In the switching mechanism 6 shown in FIG. 11b, specifically, the input member 6a and the output member 6b are arranged parallel to each other. The forward gear pair 61 comprises a drive gear 61a fitted onto the input member 6a, a driven gear 61b fitted onto the output member 6b in a rotatable manner, and an idle gear 61c interposed between the drive gar 61a and the driven gear 61b. The driven gear 61b is selectively connected to the output member 6b by a clutch C61. On the other hand, the reverse gear pair 62 comprises a drive gear 62a fitted onto the input member 6a, a driven gear 62b fitted onto the output member 6b in a rotatable manner while being meshed with the drive gear 62a. The driven gear 62b is selectively connected to the output member 6b by a clutch C62. In the switching mechanism 6 shown in FIG. 11b, the drive gar 61a and the driven gear 61b of the forward gear pair 61 are rotated in the same direction, and hence the first mode is established by connecting the driven gear 61*b* to the output member 6*b* by the clutch C61. By contrast, the drive gear 62*a* and the driven gear 62*b* are rotated in opposite directions, and hence the second mode is established by connecting the driven gear 62*b* to the output member 6*b* by the clutch C62.

A gear ratio of the forward gear pair 61 is greater than "1", and a gear ratio of the reverse gear pair 62 is smaller than "1". According to the example shown in FIG. 11*b*, therefore, the output torque of the first motor 3 is delivered to the drive wheels 9 while being amplified during forward propulsion in the EV mode. For this reason, the forward torque can be increased in the EV mode, and hence opportunities to propel the hybrid vehicle 1 in the forward direction in the EV mode may be increased. In addition, in the second mode, number of teeth involved in torque transmission is reduced in comparison with that in the first mode. For this reason, a power loss can be reduced to improve fuel efficiency.

Although the above exemplary embodiments of the present application have been described, it will be understood by those skilled in the art that the present application should not be limited to the described exemplary embodiments, and various changes and modifications can be made within the spirit and scope of the present application. For example, the controls at steps S4 and S5 may be executed without the determination about the vehicle speed.

In addition, the differential mechanism 5 and the switching mechanism 6 may be integrated into one unit. For example, the planetary gear units may be may be integrated by integrating the sun gears, the ring gears and the carriers thereof. In this case, an additional engagement device such as a clutch is interposed between predetermined rotary elements, and another predetermined rotary element serves as the input element.

Further, two or more second motors may be arranged in the hybrid vehicle as necessary.

What is claimed is:

1. An engine starting control system for a hybrid vehicle, comprising:
    a differential mechanism including a first rotary element connected to an engine, a second rotary element connected to a first motor, and a third rotary element delivering torque to drive wheels; and
    a stopping member that selectively stops a rotation of the first rotary member, wherein
    an output torque of the first motor is applied to the third rotary element while stopping the rotation of the first rotary element by the stopping member,
    the engine starting control system comprising:
    a switching mechanism including an input member rotated integrally with the third rotary element and an output member connected to the drive wheels, in which an operating mode is switched between a first mode in which the input member and the output member are rotated in the same direction, and a second mode in which the input member and the output member are rotated in opposite directions; and
    a controller that controls the engine, the first motor, and the switching mechanism, wherein the controller is configured to
    maintain the operating mode of the switching mechanism when starting the engine by the first motor, in a state in which the hybrid vehicle is propelled in the forward direction by a torque outputted by the first motor and the switching mechanism is in the second mode, or in a state in which the hybrid vehicle is propelled in the reverse direction by the torque outputted by the first motor and the switching mechanism is in the first mode;
    increase a rotational speed of the engine by the first motor to a level at which combustion of the engine can be maintained; and
    switch the operating mode of the switching mechanism by reversing a rotation of the input member when the rotational speed of the engine is increased to the level at which combustion of the engine can be maintained when starting the engine by the first motor during propulsion in an electric vehicle (EV) mode.

2. The engine starting control system for a hybrid vehicle as claimed in claim 1, wherein the controller is further configured to:
    determine whether or not a speed of the hybrid vehicle is lower than a reference speed; and
    execute the control to maintain the operating mode of the switching mechanism when starting the engine by the first motor, and the control to increase the rotational speed of the engine to the level at which combustion of the engine can be maintained, in a case that the speed of the hybrid vehicle is lower than the reference speed.

3. The engine starting control system for a hybrid vehicle as claimed in claim 1, wherein the switching mechanism comprises:
    a planetary gear unit adapted to perform a differential action among rotary elements including a sun gear, a ring gear and a carrier supporting pinion gears interposed between the sun gear and the ring gear;
    a clutch that establishes the first mode in the switching mechanism by connecting any two of rotary elements of the planetary gear unit to rotate the planetary gear unit integrally; and
    a brake that establishes the second mode in the switching mechanism by restricting a rotation of any one of the rotary elements of the planetary gear unit.

4. The engine starting control system for a hybrid vehicle as claimed in claim 3,
    wherein the sun gear is connected to the input member, the ring gear is connected to the output member, and the carrier is connected to the brake, and
    wherein the second mode is established in the switching mechanism by halting the carrier by the brake.

5. The engine starting control system for a hybrid vehicle as claimed in claim 1,
    wherein the first motor includes a motor-generator having a generating function,
    wherein the hybrid vehicle further comprises at least one second motor that is operated by an electric power generated by the motor-generator to generate a drive force for propelling the hybrid vehicle, and
    wherein the hybrid vehicle is powered by the first motor and the second motor.

6. The engine starting control system for a hybrid vehicle as claimed in claim 2, wherein the switching mechanism comprises:
    a planetary gear unit adapted to perform a differential action among rotary elements including a sun gear, a ring gear and a carrier supporting pinion gears interposed between the sun gear and the ring gear;
    a clutch that establishes the first mode in the switching mechanism by connecting any two of rotary elements of the planetary gear unit to rotate the planetary gear unit integrally; and a brake that establishes the second mode in the switching mechanism by restricting a rotation of any one of the rotary elements of the planetary gear unit.

7. The engine starting control system for a hybrid vehicle as claimed in claim 6,
wherein the sun gear is connected to the input member, the ring gear is connected to the output member, and the carrier is connected to the brake, and
wherein the second mode is established in the switching mechanism by halting the carrier by the brake.

8. The engine starting control system for a hybrid vehicle as claimed in claim 2,
wherein the first motor includes a motor-generator having a generating function,
wherein the hybrid vehicle further comprises at least one second motor that is operated by an electric power generated by the motor-generator to generate a drive force for propelling the hybrid vehicle, and
wherein the hybrid vehicle is powered by the first motor and the second motor.

9. The engine starting control system for a hybrid vehicle as claimed in claim 3,
wherein the first motor includes a motor-generator having a generating function,
wherein the hybrid vehicle further comprises at least one second motor that is operated by an electric power generated by the motor-generator to generate a drive force for propelling the hybrid vehicle, and
wherein the hybrid vehicle is powered by the first motor and the second motor.

10. The engine starting control system for a hybrid vehicle as claimed in claim 4,
wherein the first motor includes a motor-generator having a generating function,
wherein the hybrid vehicle further comprises at least one second motor that is operated by an electric power generated by the motor-generator to generate a drive force for propelling the hybrid vehicle, and
wherein the hybrid vehicle is powered by the first motor and the second motor.

11. The engine starting control system for a hybrid vehicle as claimed in claim 6,
wherein the first motor includes a motor-generator having a generating function,
wherein the hybrid vehicle further comprises at least one second motor that is operated by an electric power generated by the motor-generator to generate a drive force for propelling the hybrid vehicle, and
wherein the hybrid vehicle is powered by the first motor and the second motor.

12. The engine starting control system for a hybrid vehicle as claimed in claim 7,
wherein the first motor includes a motor-generator having a generating function,
wherein the hybrid vehicle further comprises at least one second motor that is operated by an electric power generated by the motor-generator to generate a drive force for propelling the hybrid vehicle, and
wherein the hybrid vehicle is powered by the first motor and the second motor.

* * * * *